United States Patent [19]

Partos

[11] 3,764,698
[45] Oct. 9, 1973

[54] INSECTICIDES COMPOSITIONS AND METHODS EMPLOYING 3,4, SUBSTITUTED PHENYLMETHYLSULFINATES

[75] Inventor: Richard D. Partos, Gulf Breeze, Fla.

[73] Assignee: Monsanto Company, St. Louis, Mo.

[22] Filed: May 21, 1970

[21] Appl. No.: 39,528

[52] U.S. Cl. ......... 424/303, 260/456 R, 260/456 P, 424/186, 424/200, 424/213, 424/216, 424/218, 424/224, 424/264, 424/285, 424/300
[51] Int. Cl. ...................... A01n 9/14, C07c 145/00
[58] Field of Search ................ 424/303; 260/456 P, 260/456 R, 456 NS

[56] References Cited
UNITED STATES PATENTS

| 2,632,698 | 3/1953 | Stewart | 71/103 |
|---|---|---|---|
| 3,138,519 | 6/1964 | Riden et al. | 71/103 X |
| 3,200,146 | 8/1965 | Weil et al. | 260/453 X |
| 3,332,976 | 7/1967 | Freedman | 260/453 |
| 3,395,232 | 7/1968 | White | 424/303 |
| 3,463,803 | 8/1969 | Aichenegg | 424/303 X |

*Primary Examiner*—Albert T. Meyers
*Assistant Examiner*—Donald B. Moyer
*Attorney*—Paul C. Krizov, Neal E. Willis and John J. Henschke, Jr.

[57] ABSTRACT

Substituted phenyl sulfinates are used as insecticides.

6 Claims, No Drawings

INSECTICIDES COMPOSITIONS AND METHODS EMPLOYING 3,4, SUBSTITUTED PHENYLMETHYLSULFINATES

This invention relates to new and useful sulfinates and to insecticidal compositions and methods utilizing at least one of them.

The compounds of this invention are substituted phenyl alkyl- and alkenylsulfinates that can be represented by the formula

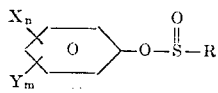

wherein R is alkyl or haloalkyl having from one through six carbon atoms or alkenyl or haloalkenyl having from two through six carbon atoms, X and Y are alkyl, alkoxy or thioalkyl having from one through six carbon atoms, halogen, cyano or nitro, and $m$ and $n$ are integers from 0 through 5 with a maximum sum of 5.

The alkyl substituents can be methyl, ethyl, normal propyl, isopropyl, normal butyl, secondary butyl, tertiary butyl, normal pentyl, isopentyl, the various forms of hexyl, and the corresponding haloalkyls, alkenyls, haloalkenyls and thioalkyls.

The compounds of this invention can be readily prepared by the reaction of an appropriately substituted phenol or an alkali metal phenoxide with a sulfinyl chloride. In some cases, it is advantageous to carry out the reaction in the presence of an acid acceptor such as an amine. The preparation of these compounds is illustrated by the following examples.

EXAMPLE 1

A solution of 27 g. of methyldisulfide in 33 ml. of acetic acid was cooled to 5°C. and chlorine was admitted above the surface of the liquid. The temperature was kept at 0°–10°. When the solution became lighter in color, and then slightly darker because of the presence of excess chlorine, it was warmed to 70° and then cooled to 25° and warmed to 35° under vacuum. There was obtained 55 g. of methanesulfonylchloride.

A mixture of 5 g. of 3-tert-butyl phenol and 12.5 ml. of triethylamine in 40 ml. of chloroform was treated at 5°–10° with 6.6 g. of methanesulfinyl chloride in 15 ml. of chloroform. The mixture was stirred at 5° for 35 minutes and was then washed with water, dried, aNd evaporated. There was obtained 3-tert-butylphenyl methanesulfinate. Analysis — Calcd. for $C_{11}H_{16}O_2S$. Theory — C 62.23, H 7.60, S 15.11; Found — C 61.94, H 7.68, S 15.37.

EXAMPLE 2

About 18 grams of 3-isopropyl-4-cyano sodium phenoxide was treated with about 10 grams of methylsulfinyl chloride in about 150 milliters of benzene. After being gently agitated at room temperature for about a half hour, the reaction mixture was evaporated. A colorless oil which boiled at about 130°C. under a pressure of about 0.4 mm. of mercury was obtained. The product, 4-cyano-3-isopropylphenyl methanesulfinate, was analyzed with the following results: Calcd. for $C_{11}H_{13}NO_2S$. Theory — N 6.27; S 14.36; Found — N 5.99, S 12.54.

EXAMPLE 3

About 50 grams of 3,4-dichlorophenol dissolved in ether at a temperature of about 0°C and about 31 grams of triethylamine in 200 cc. of diethyl ether were introduced into a suitable reaction vessel having means for agitation. About 31 grams of methylsulfinyl chloride dissolved in about 200 cc. of diethyl ether were added, and the reaction mixture stirred for about 15 minutes. After filtration and evaporation, a yellow oil was obtained. This product, 3,4-dichlorophenyl methane-sulfinate, was analyzed with the following results: Calcd. for $C_7H_6Cl_2O_2S$. Theory — C 37.35, H 2.69, Cl 31.50, S 14.25; Found — C 37.24, H 2.76, Cl 31.60, S 14.09.

Other compounds of the present invention that can be prepared in substantially the same manner using properly substituted reactants include:

4-nitrophenyl methanesulfinate
2,4-dinitrophenyl methanesulfinate
3-isopropyl-4-nitrophenyl ethanesulfinate
3-isopropyl-4-cyanophenyl butanesulfinate
3,4,5-trimethylphenyl methanesulfinate
3-isopropylphenyl methanesulfinate
3,4-diethylphenyl methanesulfinate
3-methyl-4-nitrophenyl methanesulfinate
3-isopropyl-4-cyanophenyl isopropanesulfinate
3-nitrophenyl methanesulfinate
4-cyanophenyl methanesulfinate
3-methyl-4-cyanophenyl methanesulfinate
3-cyano-4,6-dinitrophenyl methanesulfinate
3,5-dicyanophenyl methanesulfinate
3-chlorophenyl methanesulfinate
3,4-dibromophenyl methanesulfinate
3,4-diiodophenyl-n-propanesulfinate 3-isopropyl-4-n-propylphenyl isopropanesulfinate
3-isopropyl-4-cyanophenyl-t-butanesulfinate
3,4,5-triethylphenyl methanesulfinate
3,4,5-trifluorophenyl secondary butanesulfinate
4-cyano-5-isopropylphenyl methanesulfinate
4-cyano-5-methylphenyl methanesulfinate
2-cyano-5-isopropylphenyl methanesulfinate
2-cyano-4-isopropylphenyl methanesulfinate
3,5-dimethyl-4-cyanophenyl methanesulfinate
2-isopropyl-4-cyanophenyl methanesulfinate
3-t-butyl-4-cyanophenyl methanesulfinate
3-isopentyl-4-cyanophenyl methanesulfinate
3-isopropyl-4-nitrophenyl methanesulfinate
3-isopropyl-4-methoxyphenyl methanesulfinate
3-isopropyl-4-butoxyphenyl methanesulfinate
3-isopropyl-4-phenyl methanesulfinate
2-iodo-5-isopropylphenyl methanesulfinate
2-propoxy-5-isopropylphenyl methanesulfinate
2-methyl-5-isopropylphenyl methanesulfinate
2-nitro-5-isopropylphenyl methanesulfinate
3,4-dichlorophenyl pentanesulfinate
3,4-dichlorophenyl hexanesulfinate
3-isopropyl-4-cyanophenyl n-hexanesulfinate
3,4-dibromophenyl ethanesulfinate
3,4-difluorophenyl secondary butanesulfinate
3,4-diiodophenyl ethanesulfinate
3,4-dichlorophenyl isopentanesulfinate The terms "insect" and "insecticide" are used herein in their broad common usage to include spiders, mites, ticks, and like pests which are not in the strict biological sense classed as insects. Thus, the usage herein conforms to the definitions provided by Congress in Public Law 104, the "Federal Insecticide, Fungicide, and Rodenticide Act" of 1947, section 2, subsection h, wherein the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites ticks, centipedes, and wood lice.

The compounds of this invention are particularly useful in combatting and controlling pests which infest the soil, including nematodes and soil insects. The most important of these, from an economical point of view are nematodes of the genus Meloidogyne and the genus Heterodera and soil insects of the genus Diabrotica which includes, among other insects, the northern corn rootworm (*Diabrotica longicornis*), western corn rootworm (*Diabrotica virgifera*), the southern corn rootworm or spooted cucumber beetle *Diabrotica undecimpunctate howardi*), and the banded cucumber beetle (*Diabrotica balteata*). These insects, in their larval stages, attack numerous commercially important crops such as corn, cucurbits, peanut pods, cucumbers, and sweet potatoes. In accordance with this invention, it has been found that they can be readily controlled by bringing an effective amount of a compound of this invention into contact with their larval stage.

In order to demonstrate the utility of the compounds of this invention agains Diabrotica larvae, 3,4-dichlorophenyl methylsulfinate was incorporated into soil containing corn root segments, and the soil was infested with western corn rootworm larvae (*Diabrotica virgifera*). The soil was then maintained for 48 hours at 25°C. and the larval mortality determined. A 100 percent mortality rate was obtained with soil containing 6 ppm of 3,4-dichlorophenyl methylsulfinate. In repetition of this procedure, an 80 percent larval mortality rate was obtained with 3-isopropyl-4-cyanophenyl methylsulfinate at the same concentration.

The activity of these compounds against the southern corn rootworm (*Diabrotica undecimpunctata howardi*) is demonstrated by the following:

To a growth pouch (diSPo Seed-Pak growth pouch, Catalogue No. B1220, of Scientific Products Division of American Hospital Supply Corporation, Evanston, Illinois) in an upright position is added 20 ml. of distilled water. Thereafter is added 0.1 ml. of an acetone solution of known concentration in percent by weight of a compound of this invention (for example an 0.1 ml. of an 0.1 percent by weight acetone solution of the compound provides a concentration of 5.0 ppm. thereof while 0.1 ml of an 0.02 percent by weight acetone solution of the said compound provides a concentration of 1.0 ppm. thereof). In the trough of the pouch formed by the paper wick thereof are placed two corn seeds (zeamays, Hybrid U. S. 13) about 1 inch apart. Thereupon to the trough and between the seeds is added eight to 12 ready-to-hatch eggs of the southern corn rootworm (*Diabrotica undecimpunctata howardi*), which eggs were washed (with distilled water) free of the soil in which they were incubated at room temperature for 21 days immediately prior to their placement in the trough. The socharged growth pouch is then placed in an upright position in an incubator maintained at 80°F and 70 percent relative humidity for 14 days. Immediately thereafter the growth pouches are removed and the extent of kill in percent of the particular species of corn rootworm larvae observed. At a concentration of 5 ppm, a 50 percent kill was observed with 3,4-dichlorophenyl methylsulfinate, and at the same concentration, 30 percent kills were obtained with 3-isopropyl-4-cyanophenyl methylsulfinate and with 3-isopropyl-4-nitrophenyl methylsulfinate.

The activity of a compound of this invention for the control of cattle ticks is illustrated below.

4-Cyano-3-isopropylphenyl methanesulfinate was suspended or dissolved in a trichloroethylene-olive oil mixture and impregnated in chromatographic paper. The trichloroethylene is permitted to evaporate, leaving only olive oil and the sulfinate on the paper. The unfed larval cattle ticks (*Boophilus microplus*) were exposed to the compound by self-dosing by contact with the treated surfaces.

The sulfinate was added to the mixture to provide a solution or suspension in which the concentration of the compound in the olive oil was 1.12 percent (i.e., 1.12 grams of compound in 100 ml. of olive oil). Portions of this stock solution were then diluted to provide solutions of 0.14, 0.07, 0.035 and 0.017 percents respectively.

The chromatographic paper was cut into rectangles of 9 cm. by 7.5 cm. The rectangular papers were then each supported horizontally by four pins and a 0.67 ml. portion of the sulfinate solution was run on to each of the papers. The papers were then dried, evaporating the trichloroethylene, thus leaving the olive oil with the active ingredient impregnated in the paper. Each of the papers were then formed into a packet by folding the shorter sides together and sealing each of them with a clip. This left one end open. One hundred larvae were introduced into each packet and the opening closed with a clip. After 48 hours at room temperature, the packets were opened and the number of larvae alive and dead were counted. A 100 percent kill was obtained at a concentration of 0.14 percent, 92 percent kill at 0.07 percent, a 71 percent kill at 0.035 percent and a 55 percent kill at 0.017 percent.

Although the compounds of this invention are useful per se in controlling a wide variety of insect pests, it is preferable that they be supplied to the pests or to the environment of the pests in a dispersed form in a suitable extending agent.

The term "dispersed" is used herein in its widest possible sense. Particles of the compounds may be molecular in size and held in true solution in a suitable organic solvent, or the particles may be colloidal in size and distributed throughout a liquid phase in the form of suspensions or emulsions, or in the form of particles held in suspensions by wetting agents. The term includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g., pellets, granules, powders, or dusts. The term "dispersed" also includes mixtures which are suitable for use as aerosols including solutions, suspensions, or emulsions of the compounds of this invention in a carrier such as dichloro-difluoromethane and the like which boil below room temperature at atmospheric pressure.

The expression "extending agent" as used herein includes insecticidal adjuvants and any and all of the substances in which the compounds of this invention are dispersed. It includes, therefore, the solvents of a true solution, the liquid phase of suspensions, emulsions or aerosals, the semi-solid carrier of ointments and the solid phase of partiulate solids, e.g., pellets, granules, dusts and powders.

The exact concentration of the compounds of this invention employed in combatting or controlling insect pests can vary considerably provided the required dosage (i.e., toxic or lethal amount) thereof is supplied to the pests or to the environment of the pests. When the extending agent is a liquid or mixture of liquids (e.g., as in solutions, suspensions, emulsions, or aerosols) the concentration of the active compound employed to supply the desired dosage generally will be in the range of 0.0001 to 50 percent by weight. When the extending agent is a semi-solid, the concentration of the insecticide employed to supply the desired dosage generally will be in the range of 0.1 to 75 percent by weight. From a practical point of view, the manufacturer must supply the user with a concentrate in such form that, by merely mixing with water or solid extender (e.g., powdered clay or talc) or other low-cost material available to the user at the point of use, he will have an easily prepared insecticidal spray or particulate solid. In such a concentrate composition, the insecticide generally will be present in the concentration of 5 to 95 percent by weight, the residue being any one or more of the well-known insecticidal adjuvants, such as the various surface active agents (e.g., detergents, a soap or other emulsifying or wetting agent), surface-active clays, solvents, diluents, carrier media, adhesives, spreading agents, humectants, and the like.

There are a large number of organic liquids which can be used alone or in combination for the preparation of solutions, suspensions or emulsions of the compounds of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g., those boiling almost entirely under 400°F. at atmospheric pressure and having a flash point above about 80°F., particularly kerosene), mineral oils having an unsulfonatable residue above about 80 percent and preferably above about 90 percent. In those instances wherein there may be concern about the phytotoxicity of the organic liquid extending agent a portion thereof can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like.

The insecticides of this invention can be supplied to the insect pests or to the environment of the insect pests in the form of emulsions or suspensions. Emulsions or suspensions are prepared by dispersing the compounds either per se or in the form of an organic solution thereof in water with the aid of a water-soluble surfactant. The term "surfactant" as employed herein is as used in volume II of Schwartz, Perry and Berch's "Surface Active Agents and Detergents" (1958, Interscience Publishers Inc., New York) in place of the expression "emulsifying agent" to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edtition, page 280). These surfactants include the well-known capillary-active substances which may be anionic, cationic, or non-ionic which are described in detail in Volumes I and II of Schwartz, Perry and Berch's "Surface Active Agents and Detergents" (1958, Interscience Publishers, Inc., New York) and also in the November, 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants are incorporated in this specification by reference in order to avoid unnecessary enlargement of this specification. The preferred surfactants are the water-soluble anionic non-ionic surface-active agents set forth in U. S. pat. No. 2,846,398 (issued Aug. 5, 1958). In general, a mixture of water-soluble anionic and water-soluble non-ionic surfactants is preferred.

The compounds of this invention can be dispersed by suitable methods (e.g., tumbling or grinding) in solid extending agents either of organic or inorganic nature and supplied to the insect pests' environment in particulate form. Such solid materials include for example, tricalcium phosphate, calcium carbonate, kaolin, bole, kieselguhr, talc, bentonite, attapulgite, fuller's earth, pyrophillite, diatomaceous earth, calcined magnesia, volcanic ash, sulfur and the like inorganic solid materials as well as organic materials such as powdered cork, corn husks, corn cobs, powdered wood, and powdered walnut shells. The preferred solid carriers are the adsorbent clays, e.g., diatomaceous earth. These mixtures can be used for insecticidal purposes in the dry form, or by addition of water-soluble surfactants or wetting agents the dry particulate solids can be rendered wettable by water so as to obtain stable aqueous dispersions or suspensions suitable for use as sprays. When used in the dry form, the preferred carrier is diatomaceous earth, and the concentration of the present pesticides on this carrier is normally between about 10 and 50 percent by weight of the total composition. For most practical purposes, the concentration is normally maintained between about 20 and 30 percent. A typical composition contains about 25 percent of a pesticide of the present invention and about 75 percent diatomaceous earth.

For special purposes the compounds of this invention can be dispersed in a semi-solid extending agent such as petroleum or soap (e.g., sodium stearate or oleate or palmitate or mixtures thereof) with or without the aid of solubility promoters and/or surfactants or dispersing agents.

In all of the forms described above, the dispersions can be provided ready for use in combatting insect pests or they can be provided in a concentrated form suitable for mixing with or dispersing in other extending agents. As illustrative of a particularly useful concentrate is an intimate mixture of a compound of this invention with a water-soluble surfactant in the weight proportions of 0.1 to 15 parts of surfactant with sufficient sulfinate to make 100 parts by weight. Such a concentrate is particularly adapted to be made into a spray for combatting the insect pests by the addition of water thereto.

Another useful concentrate adapted to be made into a spray for combatting a variety of insect pests is a solution (preferably as concentrated as possible) of a compound of this invention in an organic solvent therefor. The said liquid concentrate preferably contains dissolved therein a minor amount (e.g., 0.5 to 10 percent by weight of the weight of the new insecticidal agent) of a water-soluble surfactant (or emulsifying agent).

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenyl) and the water-soluble polyoxyethylene derivatives of the mono-higher fatty acid esters of hexitol anhydrides (e.g., sorbitan). These materials in general contain 15 to 30 moles of ethylene oxide per mole of the hexitol anhydride or the alkylphenol.

The compositions of this invention can also contain other additaments such as fertilizers and pesticides used as, or in combination with, the carrier materials. For example, the insecticides useful in combination with the above described compounds include parathion, methyl parathion, pyrethrine, nicotine, aldrin, chlordane, heptachlor, toxaphene, malathion, 2-isopropoxyphenyl N-methylcarbamate, 0,0,0,0,-tetramethyl 0,0'-thiodi-*p*-phenylene phosphorothioate, dimethyl phosphate of 3-hydroxy-N-methyl-cis-crotonamide, fenthion, carbofuran, mirex, DDT, dicofol, methoxychlor, dichlorvos, demeton, dimethoate, carbophenothion, ronnel, carbaryl, azinphosmethyl, methomyl, aldicarb and the like.

In controlling or combatting insect pests the compounds of this invention either per se or compositions containing them are supplied to the insect pests or to their environment in a lethal or toxic amount. This can be done by dispersing the new insecticidal agent or insecticidal composition comprising same in, on or over agricultural soil or other growth media or other media infested with insect pests or attractable to the pests for habitational or sustenance or propagational purposes, in any conventional fashion which permits contact between the insect pests and the compounds of this invention. Such dispersing can be brought about by applying sprays, dips or particulate solid compositions to a surface infested with the insect pests or attractable to the pests. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish subsurface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. A method of controlling soil insects which comprises bringing into contact with the insects an insecticidally effective amount of the compound 3,4-dichlorophenyl methylsulfinate.

2. A method of controlling soil insects which comprises brining into contact with the insects an insecticidally effective amount of the compound 3-tertiary butylphenyl methylsulfinate.

3. A method of controlling soil insects which comprises bringing into contact with the insects an insecticidally effective amount of the compound 3-isopropyl-4-cyanophenyl methylsulfinate.

4. A method of controlling soil insects which comprises bringing into contact with the insects an insecticidally effective amount of the compound 3-isopropyl-4-nitrophenyl methylsulfinate.

5. An insecticidal composition comprising an insecticidal adjuvant and an insecticidally effective amount of the compound 3-isopropyl-4-cyanophenyl methylsulfinate.

6. An insecticidal composition comprising an insecticidal adjuvant and an insecticidally effective amount of the compound 3-isopropyl-4-nitrophenyl methylsulfinate.

* * * * *